(12) United States Patent
Sepkhanov et al.

(10) Patent No.: US 11,525,553 B2
(45) Date of Patent: Dec. 13, 2022

(54) LUMINAIRE WITH COLLIMATING REFLECTOR AND A METHOD OF ASSEMBLY

(71) Applicant: SIGNIFY HOLDING B.V., Eindhoven (NL)

(72) Inventors: Ruslan Akhmedovich Sepkhanov, Eindhoven (NL); Johannes Petrus Maria Ansems, Hulsel (NL); Michel Cornelis Josephus Marie Vissenberg, Roermond (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 17/274,815

(22) PCT Filed: Sep. 10, 2019

(86) PCT No.: PCT/EP2019/074044
§ 371 (c)(1),
(2) Date: Mar. 10, 2021

(87) PCT Pub. No.: WO2020/053180
PCT Pub. Date: Mar. 19, 2020

(65) Prior Publication Data
US 2022/0049835 A1 Feb. 17, 2022

(30) Foreign Application Priority Data
Sep. 11, 2018 (EP) .................................... 18193614

(51) Int. Cl.
*F21V 7/06* (2006.01)
*F21V 7/00* (2006.01)
(Continued)

(52) U.S. Cl.
CPC .............. *F21V 7/06* (2013.01); *F21V 7/0066* (2013.01); *F21V 9/14* (2013.01); *F21Y 2115/10* (2016.08)

(58) Field of Classification Search
CPC . F21V 7/06; F21V 7/0066; F21V 9/14; F21Y 2115/10
See application file for complete search history.

(56) References Cited

U.S. PATENT DOCUMENTS

| | | | |
|---|---|---|---|
| 4,453,203 A * | 6/1984 | Pate | ........................ F21V 7/09 362/294 |
| 4,855,886 A | 8/1989 | Eijkelenboom et al. | |

(Continued)

FOREIGN PATENT DOCUMENTS

| | | |
|---|---|---|
| CN | 104214675 B | 12/2014 |
| EP | 2980472 A1 | 2/2016 |

(Continued)

OTHER PUBLICATIONS

Martin F. Schubert et al, "Linearly polarized emission from GaInN light emitting diodes with polarization-enhancing reflector", Sep. 3, 2007 / vol. 15, No. 18 / Optics Express 11218, available at: https://www.ecse.rpi.edu/~schubert/Reprints/2007-Schubert-MF-(OpticsExpress)-Linearly-polarized-emission-from-GaInN-LEDs-with-polarization-enhancing-reflector.pdf.

(Continued)

*Primary Examiner* — Tsion Tumebo (57) ABSTRACT

A luminaire (500) comprising a linearly polarized light source (200) and a collimating reflector (301) arranged to collimate light from the light source towards an optical axis OA. The reflective inner surface of the reflector comprises at least one set of grooves (306), or four spaced zones of grooves, which each extend in a respective plane including the optical axis. Each groove comprises two flat side surfaces to cause light from the light source to undergo a double (Continued)

reflection in the groove, to avoid rotation of each beamlet and thus to reduce loss of imaging of the source. This partly preserves the linear polarization of the source, for use in reducing glare in displays or from lights on the road, or enhancing sparkle for illuminating jewellery.

13 Claims, 7 Drawing Sheets

(51) Int. Cl.
*F21V 9/14* (2006.01)
*F21Y 115/10* (2016.01)

(56) References Cited

U.S. PATENT DOCUMENTS

| | | | |
|---|---|---|---|
| 8,534,877 B1* | 9/2013 | Leadford | F21V 5/02 |
| | | | 362/310 |
| 8,680,756 B2* | 3/2014 | Rong | F21V 3/04 |
| | | | 313/113 |
| 2002/0044454 A1 | 4/2002 | Roller et al. | |
| 2008/0019138 A1 | 1/2008 | Otte et al. | |
| 2008/0316751 A1* | 12/2008 | Schubert | G02B 19/0023 |
| | | | 362/296.07 |
| 2009/0201677 A1 | 8/2009 | Hoelen et al. | |
| 2012/0113537 A1 | 5/2012 | Minano et al. | |
| 2016/0381749 A1* | 12/2016 | Catalano | H01L 33/486 |
| | | | 315/297 |

FOREIGN PATENT DOCUMENTS

| | | |
|---|---|---|
| JP | 2004342507 A | 12/2004 |
| WO | 2015103522 A1 | 7/2015 |

OTHER PUBLICATIONS

Dejan Grabovickc et al, "Free Form V-groove Reflector Design with the SMS Method", Proceedings of SPIE—The International Society for Optical Engineering, Aug. 2009. DOI: 10.1117/12.827866. https://www.spiedigitallibrary.org/conference-proceedings-of-spie/7423/742303/Free-form-V-groove-reflector-design-with-the-SMS-method/10.1117/12.827866.short.

* cited by examiner

LUMINAIRE WITH COLLIMATING REFLECTOR AND A METHOD OF ASSEMBLY

CROSS-REFERENCE TO PRIOR APPLICATIONS

This application is the U.S. National Phase application under 35 U.S.C. § 371 of International Application No. PCT/EP2019/074044, filed on Sep. 10, 2019, which claims the benefit of European Patent Application No. 18193614.7, filed on Sep. 11, 2018. These applications are hereby incorporated by reference herein.

FIELD OF THE INVENTION

The present invention relates to a luminaire with a light source and a collimating reflector for collimating light from the light source towards an optical axis. The invention also relates to a method of manufacture of such a luminaire.

BACKGROUND OF THE INVENTION

Collimators or collimating reflectors are employed in a wide range of lighting applications to collimate light and create a beam of light having a desired spatial extension or beam shape. Examples of commonly used collimators include metallic or metalized reflectors, TIR collimators (in which rays undergo total internal reflection, TIR) with or without a central lens and RXI collimators (in which rays undergo refraction, reflection and total internal reflection in this sequence). Further, collimators commonly form an important part of so called illumination optics used to produce a desired light field or beam shape from a particular light source or light sources.

Generally speaking, there are collimators whose beam either resembles or does not resemble the light source. These types of collimator are referred to as imaging collimators and non-imaging collimators, respectively. In lighting applications, it is commonly preferred to use non-imaging collimators to avoid undesired visible details being reproduced in the beam of light, i.e. in the illumination produced by the collimator or collimating reflector. The undesired visible details are typically characteristics or inhomogeneities of the source. The inhomogeneity can include color inhomogeneity and/or brightness inhomogeneity.

As is commonly known, the final beam produced by a collimator is composed of so called beamlets, a beamlet is also referred to as a small beam or a ray (of light), where each beamlet is a reflection or refraction of the light output from the light source from an infinitesimal element of the collimator wall or surface. These beamlets are also often referred to as pin-hole images. In an imaging collimator, all beamlets are the same or very similar to each other, hence producing an image of the light source in question when forming a beam of light. On the other hand, beamlets that form the beam of a non-imaging collimator are different from each other, resulting in no image of the light source being produced. In this non-imaging case, some of the beamlets are usually rotated versions of other beamlets.

If the light source has a certain anisotropy, it is reproduced in each beamlet. In an imaging collimator, it is also reproduced by the final beam that exits the collimator, because the beam is just the sum of all beamlets. In a non-imaging collimator, however, the beamlets add up such that the final beam does not resemble the source.

In illumination optics, one of the most important characteristics of a collimator is the extent to which the final produced beam 'resembles' the source. With respect to this characteristic, collimators are referred to as "imaging" and "non-imaging". The final beam produced by a collimator is composed of small beams, where each beamlet is a reflection or refraction (in case of a central lens) of the source in an infinitesimal element of the collimator wall. These beamlets are also often referred to as "pin-hole" images. In an imaging collimator, all beamlets are the same or very similar to each other. The beamlets that comprise the beam of a non-imaging collimator are different from each other. Usually, some beamlets are rotated versions of other beamlets.

If the source has a certain non-homogeneity, it is reproduced in each beamlet. In an imaging collimator, it is also reproduced by the (final) beam, because the beam is just a sum of all beamlets. Whereas in a non-imaging collimator the beamlets add up such that the (final) beam does not resemble the source. For example, a parabolic reflector has both imaging and non-imaging portions. The portion above its focus is non-imaging, while the portion below its focus is imaging. In other words, the portion of reflector reflecting beamlets of which the angle $\Phi$ between the direction of the light source beamlet as issued by the light source and the direction of said light source beamlet by the reflector (being a reflected beamlet) is less than 90° is imaging, whereas the portion of reflector reflecting beamlets of which the angle $\Phi$ between the direction of the light source beamlet as issued by the light source and the direction of said light source beamlet by the reflector (being a reflected beamlet) is more than 90° is non-imaging.

Some types of collimator are imaging by nature, e.g. resulting from the shape of the collimator. Further, some types of collimator include both imaging and non-imaging portions. A parabolic collimator is a common example of a collimating reflector including both imaging and non-imaging portions. For example, a parabolic reflector has a paraboloidal three-dimensional shape formed by moving a parabolic generatrix around a circular directrix perpendicular to the line, which is effectively an optical axis, connecting its center to the apex. Such a reflector has both imaging and non-imaging portions. The portion above its focus, between the focus and the exit window, is inherently non-imaging, while the narrower portion below its focus is inherently imaging.

In luminaires using collimators, polarized beams are used for reflection glare control. By properly matching the beam polarization direction with its incidence and reflection angle, one can suppress the reflection hot spots. This can be applied e.g. in road lighting to suppress undesired hot spots in reflection off the (wet) road or other cars, in museum lighting to suppress reflection from the cover glass or reflection bright spots on art pieces, and in retail stores to remove the reflections from glass covers or windows. Another application of polarized light is that it can be used not only to suppress reflections but also to enhance reflection when desired. This can occur in jewellery lighting, if a polarized beam is used to make some parts such as gemstone facets stand out by increasing their sparkle brightness.

In order to utilize the effects of polarization, polarized beams have to be created. It is better to use a polarized source and to preserve its polarization in the beam, than to polarize the beam (for example at the exit window of the collimator) after the generation of the beam. The latter leads to either absorption of 50% of the initial (unpolarized) luminous power (=flux), or reflection of this 50% back into the optical system, which either way leads to a large fraction of this light being absorbed. A polarized source can be made, for example, using an efficient mixing volume and a linear polarizer at the luminous surface of the source.

The linear polarization of the source is defined by an angular direction i.e. an orientation, since a change of 180° to the angle is exactly equivalent. In order to preserve, at least in part, the linear polarization of the light from the source when a collimator is used, the collimator needs to be imaging or partly imaging, i.e. it has to preserve the polarization orientation for a proportion of the beamlets. This greatly limits the collimator choice and thus the design freedom. For instance, a conventional parabolic reflector or TIR-collimator cannot be used as they are both non-imaging over the main, broader region between the focus and the exit window. The beamlets, produced by each piece of their reflective walls, are rotated with respect to each other about the optical axis, reducing the imaging and thus the amount of linear polarization.

Hence, there is a need for an improved luminaire with a collimating reflector which at least partially reduces the above drawbacks.

SUMMARY OF THE INVENTION

The invention is defined by the claims.

According to examples in accordance with an aspect of the invention, there is provided a luminaire, comprising: a linearly polarized light source; and a collimating reflector arranged to collimate light from the light source towards an optical axis extending through the light source, comprising a reflector body disposed around the optical axis and comprising a light exit window for delivering the collimated light, wherein the reflector body comprises a reflective inner surface; wherein the reflective inner surface comprises a set of grooves which each extend in a respective plane including the optical axis, each groove comprising two flat side surfaces to cause light from the light source to undergo a double reflection in the groove, the grooves thereby converting a non-imaging portion of the collimating reflector into an imaging reflector portion.

This luminaire is designed for use with the linearly polarized light source generally at the focus of the reflector, the polarization direction preferably being normal to the optical axis. A collimating reflector, typically paraboloidal, is inherently non-imaging on one side of its focus and imaging on the opposite side. Grooves on an otherwise smooth reflecting surface can switch its property from imaging to non-imaging and vice versa. This is because the grooves cause light to undergo a double reflection and to emerge at the same angle as their incidence angle. The beamlets no longer undergo rotation when they are reflected. This invention exploits the conversion from non-imaging to imaging.

The grooved zones of the reflector are able to convert an inherently non-imaging region of the reflector surface into an imaging region, so that the polarization of the light source can be preserved.

Optionally, the polarization direction is normal to the optical axis. This allows the grooves most effectively to preserve the degree of polarization of the light source in the imaging process.

Optionally, the reflective inner surface comprises: a set of grooved zones, each zone comprising a set of the grooves which each extend in a respective plane including the optical axis, each groove comprising two flat side surfaces to cause light from the light source to undergo a double reflection in the groove, and at least one smooth or otherwise non-grooved zone, wherein the grooved zones and the non-grooved zone or zones alternate on the inner surface around the optical axis.

The grooved zone(s) only need to occupy certain angular position(s)—which depend(s) on the direction of polarization of the light source—in order to provide a substantial benefit in preserving the light source polarization. The smooth or otherwise non-grooved zone(s) also occupies or occupy certain angular position(s) where the imaging effect of the grooved zone(s) is less important or is not needed. The resulting patterned reflector surface may then be angularly positioned relative to the direction of linear polarization of the received light. This means that the reflector may be rotationally adjusted to control a degree by which the polarization of a light source is preserved, so that the reflector gives controllability of the output polarization conditions. The effect is achieved well with four grooved zones at quadrants, so that the variability occurs over a rotational range of 45 degrees. However, the effect can still be achieved to some extent with a different number of grooved zones, such as three, six, ten, and even up to 36 zones for example.

Each groove lies in the same plane as the optical axis, so for a regularly-shaped base opening and exit window perpendicular to the optical axis, the grooves follow a direction of a shortest path along the surface between the base, where there may be an opening narrower than the light exit window, and the light exit window. Because in a collimator the reflector diverges towards the light exit opening, the grooves diverge. To fill the grooved zone, the grooves can become wider and deeper towards the light exit window. Thus, the grooved zone needs no smooth areas between the grooves.

Preferably there are at least two of the grooved zones. This also makes it possible to select the degree of preservation of linear polarization.

In a particularly beneficial arrangement, there are four of the grooved zones. This optimizes the selection of the degree of preservation of linear polarization, by allowing the degree to be varied by rotating the light source relative to the reflector about the optical axis over a range of 45 degrees.

In this case, each grooved zone may extend around an angle of between 40 and 50 degrees, such as 45 degrees. Thus, the zones are generally of the same size in terms of their angular extent.

Optionally, there are smooth zones alternating with the grooved zones around the axis.

Thus, the zones may be of exactly the same size in their azimuthal angular extent. They each occupy a ⅛ segment. The overall shape for example has rotational symmetry of order 4.

Optionally, the grooves have a 90+/−10 degree base angle α as viewed from within the reflector. This is the optimal angular range for the effect required.

As discussed above, some collimating reflectors may employ TIR to achieve the reflection, so the beamlets undergo refraction as well as reflection. Thus it is to be understood that the grooved zones are for providing reflection either by specular reflection or by total internal reflection. The grooved zones may for example be coated for specular reflection from the two surfaces of each groove, or else the material of the reflector body may be selected to provide double total internal reflection in corresponding surfaces, based on the light source location and hence direction of incident light. The smooth zones preferably have a specular reflective surface.

In regularly shaped reflectors, the optical axis passes through the center of the light exit window, and the general reflector shape is rotationally symmetric about the optical axis. By "general reflector shape" is meant the shape if the grooves are ignored.

Conveniently, the general reflector shape is paraboloidal. A paraboloidal reflector, i.e. one with a parabola as its generatrix about its optical axis, is inherently non-imaging over a major portion on one side of its focal point, and is thus not normally suitable for preserving polarization. The use of the grooved zone(s) enables a polarization preserving effect to be achieved.

Optionally, the grooved zones are in a first region of the reflective inner surface, and the reflective inner surface may further comprise a second, smooth or otherwise non-grooved region which extends all around the inner surface. This is because the grooved zone(s) or the alternating grooved and smooth zones may only be needed in certain parts of the reflector such as where the reflector is inherently non-imaging.

In this case, the smooth region may be at an imaging portion of the reflector body and the first region may be at a non-imaging portion of the reflector body. Some designs have inherently imaging and inherently non-imaging areas, and the grooved zone(s) is or are only needed in the non-imaging area. This for example applies to a parabolic reflector.

In the case of indirect illumination, meaning that all the light from the source is reflected before it exits the luminaire, the reflector may be already inherently imaging (thus preserving polarization orientation), but alternating grooved zones can be added to make it switchable by selectively making it partially non-imaging.

The light source is optionally mounted at or near a focal point of the reflector.

The light source may comprise a light emitting diode, and optionally a mixing chamber, and optionally also an output linear polarizer.

The light source may be mounted rotatably about the optical axis. Where it includes an output linear polarizer, the whole light source or just the output linear polarizer of the light source may be mounted rotatably about the optical axis relative to the reflector. This relative rotation may be used to control the degree of polarization of the output collimated light. This rotary adjustment may be done during manufacture or final assembly, or in use by a consumer, or a fitter; it may be done dynamically by mechanically rotating the reflector with respect to the polarization orientation during luminaire operation to vary the degree of linear polarization of light produced by the luminaire.

The invention, from another aspect, provides a method of assembling a luminaire comprising:
mounting a linearly polarized light source on an optical axis of a collimating reflector, the collimating reflector comprising:
a reflector body disposed around the optical axis and comprising a light exit window for delivering collimated light, wherein the reflector body comprises a reflective inner surface, wherein the reflective inner surface comprises:
at least one grooved zone comprising a set of grooves which each extend in a respective plane including the optical axis, each groove comprising two flat side surfaces to cause light from the light source to undergo a double reflection in the groove, the grooves thereby converting a non-imaging portion of the collimating reflector into an imaging reflector portion; and
at least one smooth or otherwise non-grooved zone, wherein the grooved zone or zones and the non-grooved zone or zones alternate on the inner surface around the optical axis; and
positioning the light source so that its direction of linear polarization is normal to the optical axis and is at a selected azimuthal angle, about the optical axis, with respect to the grooved zone or zones such as to provide a required degree of linear polarization in the delivered collimated light.

It should be noted that within the context of this application the term "optical axis" may be any axis or principal direction towards which light from a light source is directed by the collimating reflector. The optical axis may typically be a central axis of the collimating reflector—around and along which axis the light being collimated by the collimating reflector is emitted. In other words, the collimating reflector is typically constituted so as to direct light towards and/or along the optical axis thereof.

It should be noted that within the context of this application the term "collimating reflector" may refer to any reflector which is collimating in the sense that light emitted from a light source is gathered or collected and directed towards or along the optical axis of the collimating reflector. In other words, a narrower beam of light is produced by the collimating reflector as compared to the light being emitted from a naked light source. The beam of light emitted from the collimating reflector may consequently include parallel light beams or may include diverging light beams although being gathered or collected by the collimating reflector.

The average distance between adjacent grooves may lie in the range of 0.1 mm to 10 mm. The distance between adjacent grooves or the pitch may vary as the radius of the collimating reflector may vary along the optical axis thereof. As an example, the radius of a parabolic reflector typically decreases at a bottom portion thereof, resulting in a decreased distance between adjacent grooves as the grooves extend towards the bottom of the parabolic reflector. An average distance between adjacent grooves may lie in the range of 0.5 mm to 3 mm.

The depth of the grooves may lie in the range of 0.05 mm to 5 mm.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

As illustrated in the figures, the sizes of layers and regions are exaggerated for illustrative purposes and, thus, are provided to illustrate the general structures of embodiments of the present invention and of comparative examples.

DETAILED DESCRIPTION OF THE EMBODIMENTS

The invention and comparative examples will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

As background to the invention, comparative examples of reflectors and luminaires are described with reference to FIGS. 1-4, which were invented by the present inventors and are the subject of a copending, unpublished European patent application.

Figure 1:
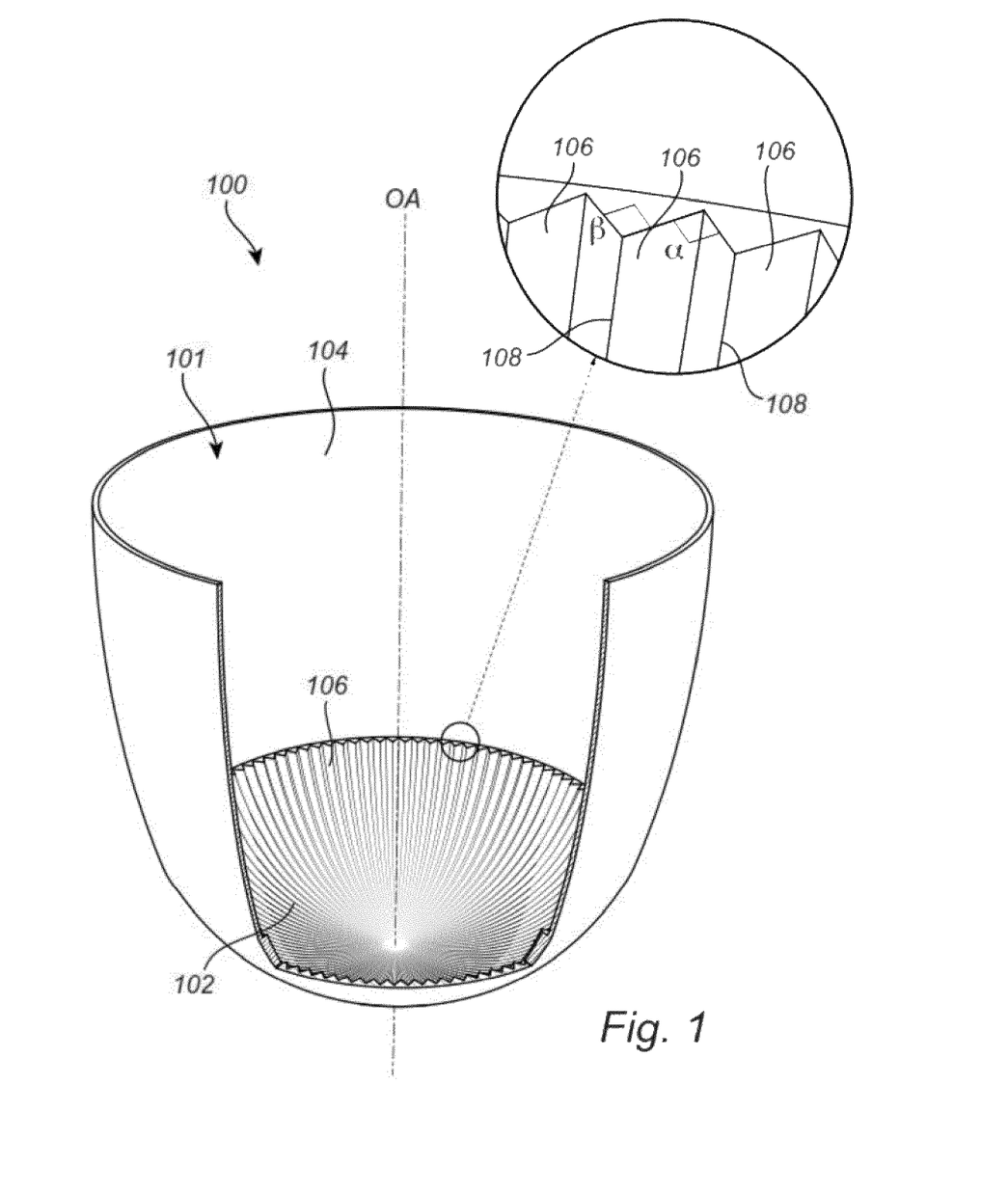
FIG. 1 is a perspective view of a collimating reflector.
Figure 2A:
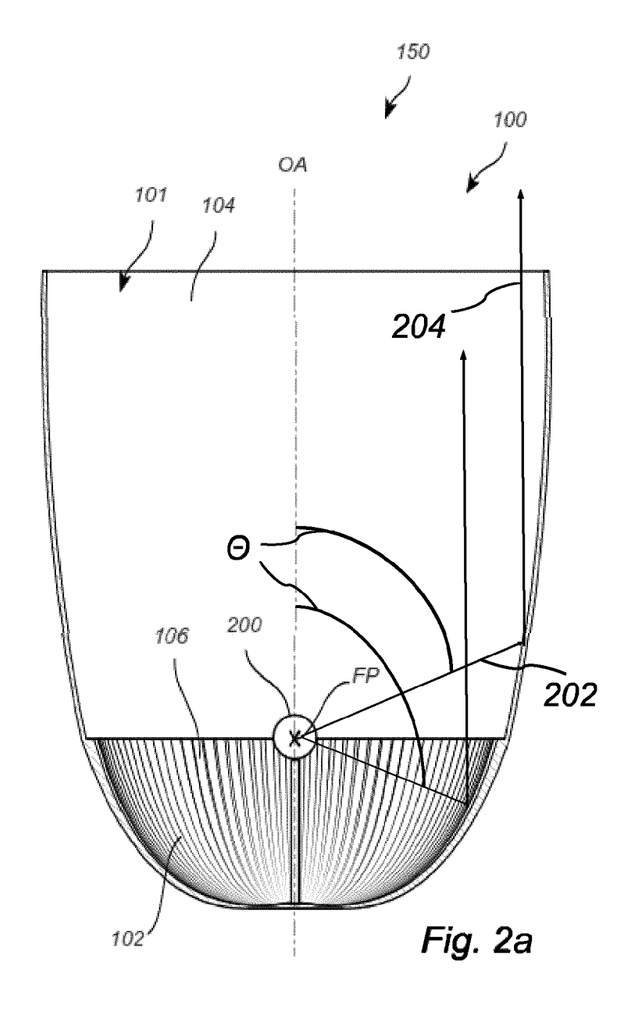
FIG. 2a is a cross sectional view of a luminaire including the collimating reflector of FIG. 1.
Figure 2B:
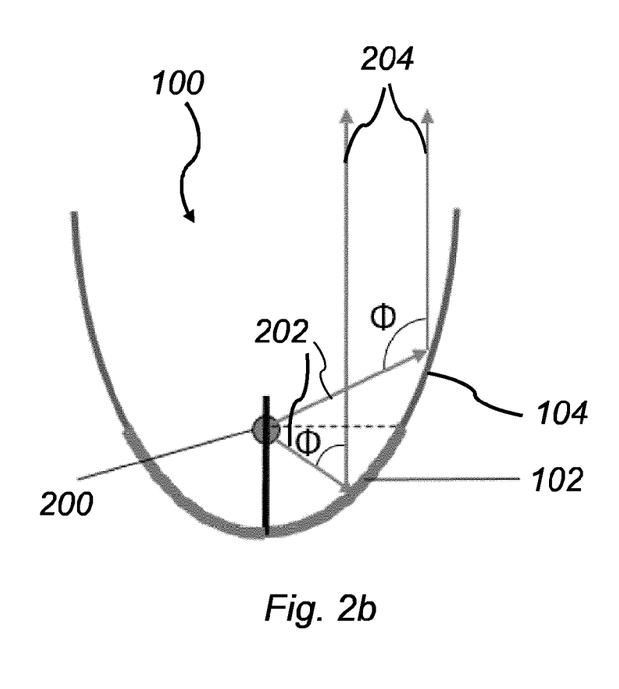
FIG. 2b shows the explanation for the definition of a non-imaging and an imaging portion of a collimating reflector.

Referring first to FIGS. 1 and 2a, a collimating reflector 100 is designed to minimize source imaging effects in the output beam, i.e. for a purpose opposite to that of the present invention. The collimating reflector 100 has a reflecting surface 101 designed to reflect and collimate light. The depicted collimating reflector 100 of FIG. 1 and FIG. 2 is a parabolic reflector 100, i.e. a reflector whose cross sectional shape resembles a parabolic shape. A parabolic reflector is a type of collimating reflector 100 which is partially imaging and partially non-imaging by nature. This means that reflective surface 101 of the collimating reflector 100 of FIG. 1 includes an imaging portion 102 and a non-imaging portion 104. The imaging portion 102 of reflective surface 101 is inherently imaging in the sense that a light source 200, as depicted in FIG. 2a, positioned at the focal point FP of the parabolic reflector, will be reproduced or imaged in a light beam produced by the collimating reflector 100. It is to be noted that the light source 200 is not depicted in FIG. 1 for reasons of legibility. In this respect FIG. 2b shows the determination of non-imaging 104 and imaging portion 102 of the collimating reflector 100. That portion of reflector reflecting beamlets, also referred to as rays, of which the angle Φ between the direction of the light source ray 202 as issued by the light source 200 and the direction of said light source ray by the reflector, being a reflected ray 204, is less than 90° is the imaging portion 102, whereas the portion of reflector reflecting light source rays 202 of which the angle Φ between the direction of the light source ray as issued by the light source and the direction of said light source ray by the reflector, being reflected ray 204, is more than 90° is the non-imaging portion 104.

The non-imaging portion 104 of the reflective surface 101 is a smooth reflective surface designed to reflect light for a light source so as to form a beam of light. The inherently non-imaging portion 104 may be a metalized surface of a glass or a plastic material or may be made of polished metal, to give a few examples. The non-imaging portion 104 may further be made reflective in any other suitable way. In the depicted embodiment of FIG. 1 and FIG. 2, the non-imaging portion 104 of the reflective surface 101 is non-diffusing. This means that the non-imaging portion 104 of the reflective surface 101 is smooth and clear like a mirror. The non-imaging portion 104 of the reflective surface 101 may however be made diffusing, e.g. by being made rough or similar while still being reflective in the sense that the non-imaging portion 104 of the reflective surface 101 reflects light impinging on the surface.

The imaging portion 102 of the reflective surface 101 of the collimating reflector of FIG. 1 comprises grooves 106. The grooves 106 extend in a direction corresponding to a projection of the optical axis OA on the reflecting surface 101. In other words, the grooves 106 extend along the reflective surface 101 in a direction corresponding to a section coinciding with the optical axis OA of the collimating reflector 100. As can be seen in FIG. 1 and FIG. 2, the grooves 106 are provided on the imaging portion 102 of the reflective surface 101, whereas no grooves 106 are provided on the non-imaging portion 104 of the reflective surface 101.

In the parabolic reflector 100 of FIG. 1 and FIG. 2, the imaging portion 102 of the reflective surface 101 is defined by the portion of the reflective surface 101 positioned below the focal point FP of the collimating reflector 100 as seen along the optical axis OA, because the source is positioned at the focal point FP. For the parabolic reflector 100 of FIG. 1 and FIG. 2, the imaging portion 102 is the portion of the reflector 100 for which the following holds true: a decrease of the minimal angle between the optical axis OA and an outgoing ray emitted by the source 200 is accompanied by a decrease of distance between a reflection of the ray and the optical axis OA at the point where the ray exits the reflector 100. For the non-imaging portion 104 of the reflector 100 the opposite holds true: that is a decrease of the minimal angle between a ray emitted by the light source 200 and the optical axis OA is accompanied by an increase of distance between the reflected ray and the optical axis OA within a plane where the ray exits the reflector 100. For the specific parabolic reflector 100 depicted in FIG. 1, the portion 102 of collimating reflector 100 which reflects rays of light or beamlets emitted by the light source 200 whose angle Θ with respect to the optical axis is larger than 90° is imaging. On the other hand, the portion 104 of the collimating reflector 100 which reflects rays of light or beamlets emitted by the light source 200 whose angle Θ with respect to the optical axis OA is smaller than 90° is non-imaging.

In the parabolic reflector 100 of FIG. 1 and FIG. 2, the grooves 106 are V-shaped in a cross section taken along a plane perpendicular to the optical axis OA. In other words, in a section through the grooves 106, each individual groove 106 has a cross sectional shape resembling the shape of a V. The use of V-shaped grooves 106 causes beamlets originating from different V-shaped grooves 106 to rotate twice as fast as the position on the collimating reflector 100 moves, thus counteracting the imaging effect of the imaging portion 102 of the reflective surface 101 on the light source 200.

In the parabolic reflector 100 of FIG. 1 and FIG. 2, the grooves 106 are V-shaped as discussed above. The angle α between inner surfaces of a groove 106 is 90° in the parabolic reflector 100 of FIG. 1 and FIG. 2. However, the angle α between inner surfaces of a groove 106 may typically be 90°±10° so as to efficiently counteract the effect that the imaging portion 102 of the reflective surface 101 images the light source 200.

In the parabolic reflector 100 of FIG. 1 and FIG. 2, the imaging portion 102 of the reflective surface 101 is corrugated by the grooves 106. This means that the complete imaging portion 102 of the reflective surface 101 is covered by or formed by the grooves 106. Such an arrangement of the grooves 106 results in that the adjacent grooves 106 are separated by a ridge 108, where each ridge 108 has a top angle ß. As is to be understood, the angle ß will have a value corresponding to the value of the angle α. However, in practice, the angle ß will be slightly larger than the angle α to account for the rotation along the collimator 100. In other words, both α and ß are close to 90° in the depicted embodiment of FIG. 1 and FIG. 2.

In the parabolic reflector 100 of FIG. 1 and FIG. 2, an average distance between adjacent grooves is typically from 0.1 mm up to 10 mm which results in that imaging of the light source 200 is counteracted in the imaging portion 102 of the reflective surface 101. As is depicted in FIG. 1 and FIG. 2, the distance between adjacent grooves 106 or the pitch will vary along the reflecting surface 101 of the collimating reflector 100. The distance between adjacent grooves 106 will become smaller towards the bottom of the collimating reflector 100 as the radius of the collimating reflector 100 decreases, thus squeezing the grooves 106 together at a smaller distance i.e. at a smaller circumference.

In the parabolic reflector 100 of FIG. 1 and FIG. 2, the depth of the grooves 106 of the imaging portion 102 of the reflective surface 101 is typically from 0.05 mm up to 5 mm deep. More specifically, the depth of the grooves 106 may be decreased proportionally to a decrease in distance between adjacent grooves, so as to maintain the shape of the grooves 106 irrespective of their size. In other words, the angles α and ß may be kept constant at 90° along the grooves 106 in FIG. 1 and FIG. 2.

The depth of the grooves 106 may however be varied to suit specific needs and desires. The grooves 106 may have a constant depth or the depth may be altered in discrete increments, to give a few examples.

In FIG. 1 and FIG. 2 the collimating reflector 100 has been described as being a parabolic reflector. However, the shape of the collimating reflector 100 may be altered such that the cross section of the collimating reflector 100 no longer resembles a parabolic shape.

In the above described examples, the imaging portion 102 of the reflective surface 101 has been described as being provided with grooves 106, whereas the non-imaging portion 104 of the reflective surface 101 has been described as a smooth reflective surface. It is however to be understood that both the imaging portion 102 of the reflective surface 101 and the non-imaging portion 104 of the reflective surface 101 may be provided with grooves 106.

One possible way of designing V-grooves in reflectors, to produce a mirrorless TIR device using V-grooves that emulates a parabolic reflector, is described in "Free form V-groove reflector design with the SMS method" by Dejan Grabovičlić, Juan C. Miñano and Pablo Benítez, Proceedings of SPIE—The International Society for Optical Engineering—August 2009—DO I: 10.1117/12.827866, which is available at: https://www.spiedigitallibrary.org/conference-proceedings-of-spie/7423/742303/Free-form-V-groove-reflector-design-with-the-SMS-method/10.1117/12.827866.short.

Since the collimating reflector 100 of FIG. 2 is employed with a light source 200, a luminaire or luminaire 150 is formed by the collimating reflector 100 and the light source 200. The collimating reflector 100 collimates light emitted from the light source 200. The light source may be a solid state light source.

The light source 200 is depicted as a spherical light emitting element positioned in the focal point FP of the collimating reflector 100 in FIG. 2. However, light sources 200 of different shapes and/or sizes may be used with the collimating reflector 100 so as to form a luminaire 150.

The light source 200 is optionally a solid state light source such as a LED light source. The light source 200 may thus be made of a single light emitting element or die or a plurality of light emitting elements or dies arranged next to each other in e.g. a matrix-like pattern. By the grooves 106 present on the imaging portion 102 of the reflective surface 101, imaging of the light source 200 will be counteracted as described above. In other words, the grooves 106 present on the imaging portion 102 of the reflective surface 101 will mix the light emitted from the light source 200, which in turn means that undesired inhomogeneity or defects resulting from the light source may be reduced. This means that reproduction of a spatially extending color and/or brightness distribution of the light source 200 in the light field or beam emitted from the luminaire 150 by the collimating reflector 100 may be counteracted or reduced, as compared to luminaire including a traditional collimating reflector void of grooves of the above described kind.

Figure 3:
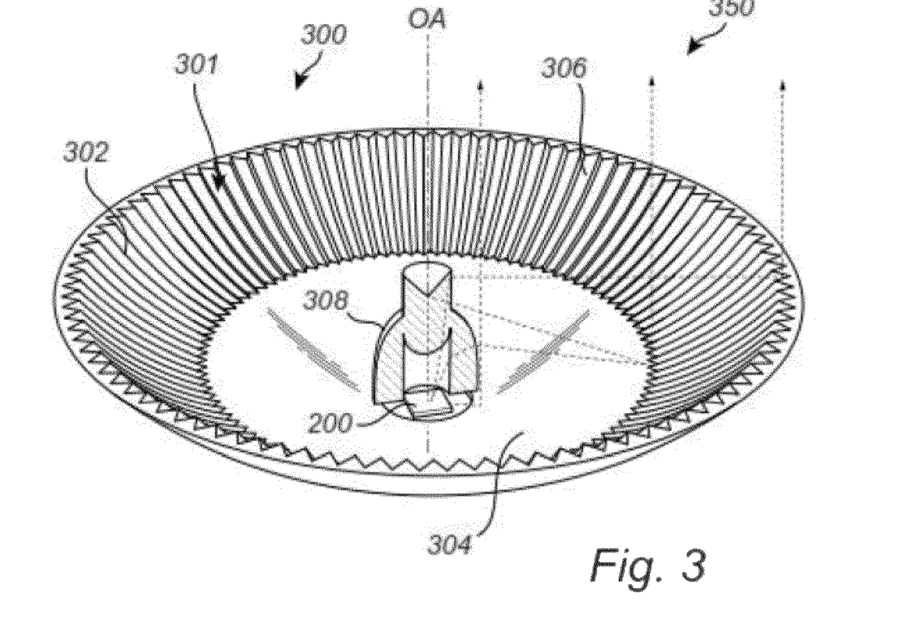
FIG. 3 is a perspective view of a luminaire including an optical element directing light to the reflecting surface of a collimating reflector.

Now referring to FIG. 3, there is conceptually depicted a luminaire 350. The luminaire 350 of FIG. 3 is differently shaped and constructed as compared to the luminaire 150 of FIG. 2. The luminaire 350 includes a collimating reflector 300 for collimating light emitted from a light source 200. The light source 200 of FIG. 3 is positioned below an optical element 308 in form of a lens 308. The lens 308 is shown as being cut through for reasons of legibility although being rotationally symmetric with respect to the optical axis OA of the collimating reflector 300. The optical element 308 or lens 308 directs light emitted from the solid state light source 200 of FIG. 3 to the reflecting surface 301 of the collimating reflector 300. The directing of the light emitted from the solid state light source 200 to the reflecting surface 301 of the collimating reflector 300 results in that the optical element 308 or lens 308 creates an image of the solid state light source 200 on a portion 302 of the reflecting surface 301 of the collimating reflector 300. More specifically, the reflecting surface 301 of the collimating reflector 300 has an imaging portion 302 imaging the light source, and a non-imaging portion 304, similar to the collimating reflector 100 of FIG. 1 and FIG. 2.

In this case the light source 200 is imaged by the optical element 308 or lens 308 creating a secondary image of the solid state light source 200 on the imaging portion 302 of the collimating reflector 300. In this case, the imaging portion 302 of the collimating reflector 300 is situated above the non-imaging portion 304 of the collimating reflector 300 when moving along the optical axis OA of the collimating reflector 300 away from the light source 200. The inverted locations of the imaging portion 302 and the non-imaging portion 304 of the collimating reflector 300 of FIG. 3 as compared to the collimating reflector 100 of FIG. 1 and FIG. 2 is pertaining to the properties of the lens 308 and how the light emitted from the light source 200 is directed to the reflecting surface 301 of the collimating reflector 300 of FIG. 3. Similarly, to FIG. 1 and FIG. 2, the portion 302 of collimating reflector 300 is imaging, whereas the portion 304 of the collimating reflector 300 is non-imaging. As described above, the imaging portion 302 is the portion of the reflector 300 for which the following holds true: a decrease of the minimal angle between the optical axis OA and an outgoing ray emitted by the source 200, and refracted by the lens 308, is accompanied by a decrease of distance between a reflection of the ray and the optical axis OA at the point where the ray exits the reflector 300. For the non-imaging portion 304 of the reflector 300 the opposite holds true: that is a decrease of the minimal angle between a ray emitted by the light source 200 and refracted by the lens 308, and the optical axis OA is accompanied by an increase of distance between the reflected ray and the optical axis OA within a plane where the ray exits the reflector 300.

In the collimating reflector 100 of FIG. 1 and FIG. 2, the light emitted from the light source 200 is directly impinging on the reflective surface 101 of the collimating reflector 100, whereas in FIG. 3 light emitted from the light source 200 is directed by the lens 308 before reaching the reflective surface 301 of the collimating reflector 300.

The imaging portion 302 of the reflective surface 301 of the collimating reflector 300 in FIG. 3 is employed with grooves 306. The grooves 306 are of the kind of grooves 106 as described above in conjunction with FIG. 1 and FIG. 2 and consequently bring about the same advantages. Moreover, the grooves 306 may be modified correspondingly to the grooves 106 as described above in conjunction with FIG. 1 and FIG. 2. The grooves 306 counteract imaging of the secondary image of the light source 200 as produced by the lens 308.

Figure 4:
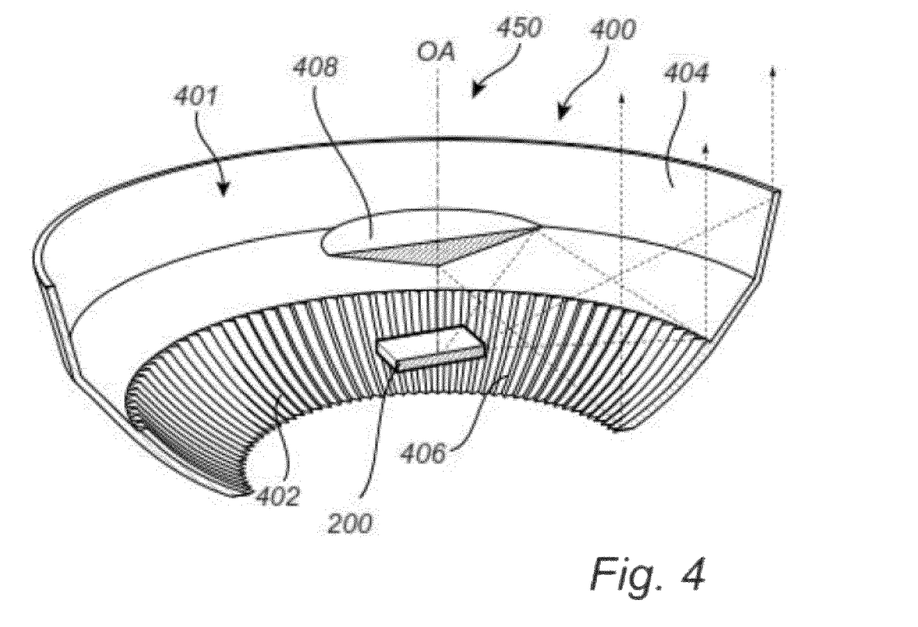
FIG. 4 is a perspective cross sectional view of a luminaire including an optical element directing light to the reflecting surface of a collimating reflector.

Now referring to FIG. 4, here is conceptually depicted a luminaire 450. The luminaire 450 of FIG. 4 is differently shaped and constructed as compared to the luminaires 150 and 350 of FIG. 2 and FIG. 3 respectively. The luminaire 450 includes a collimating reflector 400 for collimating light emitted from a light source 200. The light source 200 of FIG. 4 is positioned below an optical element 408 in form of a conical mirror element 408 or reflective element 408. The luminaire 450 is shown as being cut through for reasons of legibility although being rotationally symmetric with respect to the optical axis OA of the collimating reflector 400. The optical element 408 or mirror element 408 directs light emitted from the solid state light source 200 of FIG. 4 to a portion 402 the reflecting surface 401 of the collimating reflector 400. The directing of the light emitted from the solid state light source 200 to the portion 402 of the reflecting surface 401 of the collimating reflector 400 results in that the optical element 408 or mirror element 408 creates an image of the solid state light source 200 on the portion 402 of the reflecting surface 401 of the collimating reflector 400. More specifically, the reflecting surface 401 of the collimating reflector 400 consequently has an imaging portion 402, imaging the light source, and a non-imaging portion 404, similar to the collimating reflector 100 of FIG. 1 and FIG. 2. In this case the light source 200 is imaged by the optical element 408 or mirror element 408 creating a secondary image of the solid state light source 200 on the imaging portion 402 of the collimating reflector 400. In this case, the imaging portion 402 of the collimating reflector 400 is situated below the non-imaging portion 404 of the collimating reflector 400 when moving along the optical axis OA of the collimating reflector 400 away from the light source 200, as in FIG. 1 and FIG. 2. Similarly, to FIG. 1 and FIG. 2, the portion 402 of collimating reflector 400 which reflect rays of light or beamlets reflected by the mirror element 408 is imaging. On the other hand, the portion 404 of the collimating reflector 400 which reflect rays of light or beamlets directly emitted by light source is non-imaging. Hence, as described above, the imaging portion 402 is the portion of the reflector 400 for which the following holds true: a decrease of the minimal angle between the optical axis OA and an outgoing ray emitted by the source 200, and reflected by the mirror element 408, is accompanied by a decrease of distance between a reflection of the ray and the optical axis OA at the point where the ray exits the reflector 400. For the non-imaging portion 404 of the reflector 400 the opposite holds true: that is a decrease of the minimal angle between a ray emitted by the light source 200 and the optical axis OA is accompanied by an increase of distance between the reflected ray and the optical axis OA within a plane where the ray exits the reflector 400.

In the collimating reflector 100 of FIG. 1 and FIG. 2, the light emitted from the light source 200 is directly impinging on the reflective surface 101 of the collimating reflector 100, whereas in FIG. 3 light emitted from the light source 200 is directed by the lens 308 before reaching the reflective surface 301 of the collimating reflector 300. However, in FIG. 4, the light impinging on the portion 404 originates directly from the light source, whereas the light impinging on the portion 402 is reflected by the mirror element 408.

The imaging portion 402 of the reflective surface 401 of the collimating reflector 400 in FIG. 4 has grooves 406. The grooves 406 are of the kind of grooves 106 as described above in conjunction with FIG. 1 and FIG. 2 and consequently bring about the same advantages. Moreover, the grooves 406 may be modified correspondingly to the grooves 106 as described above in conjunction with FIG. 1 and FIG. 2. The grooves 406 counteract imaging of the secondary image of the light source 200 as produced by the mirror element 408.

Many different alterations, modifications and the like will become apparent to those skilled in the art. For example, the shape of the collimating reflectors 100, 300, 400 may be altered. Also the shapes and characteristics of the grooves 106, 306, 406 may be modified so as to achieve specific light beams or light fields emitted from the respective collimating reflectors 100, 300, 400.

In the depicted examples of FIGS. 1-4, the grooves 106, 306, 406 are provided on an inside of the respective collimating reflectors 100, 300, 400. In other words, the grooves 106, 306, 406 are provided on a surface of the respective collimating reflectors 100, 300, 400 facing the respective optical axis OA. This arrangement is employed where the reflecting surface is provided on an inside of the respective collimating reflectors 100, 300, 400 as is the case with e.g. metallic reflectors or similar. On the other hand, a collimating reflector could take the form of a dielectric reflector, in which case the grooves 106, 306, 406 may be provided on the outside of the reflector, i.e. on a surface of the collimating reflector facing away from the optical axis thereof.

Embodiments of the invention will now be described with reference to FIGS. 5 to 8. The inventors discovered that whilst the grooves described above with reference to FIGS. 1 to 4 cause an inherently imaging portion of the reflector to become non-imaging, the same types of groove formed instead on an inherently non-imaging portion have the reverse optical effect, making the non-imaging portion imaging, at least in part. The inventors have realized that this effect may be exploited in a luminaire for producing linearly polarized light, for the benefits identified above, e.g. polarized beams are used for reflection glare suppression or to enhance sparkle brightness. This can be done efficiently because there is no need for any polarizing element, such as a filter, at the light exit.

In other words, the inventors discovered that the grooved part could be swapped with the smooth part of the reflectors of FIGS. 1 to 4, to create the reverse effect, i.e. to preserve the imaging of the source at least in part. This applies whether the grooves are on an upper or a lower region of the reflector, as viewed in FIGS. 1 to 4.

Figure 5:
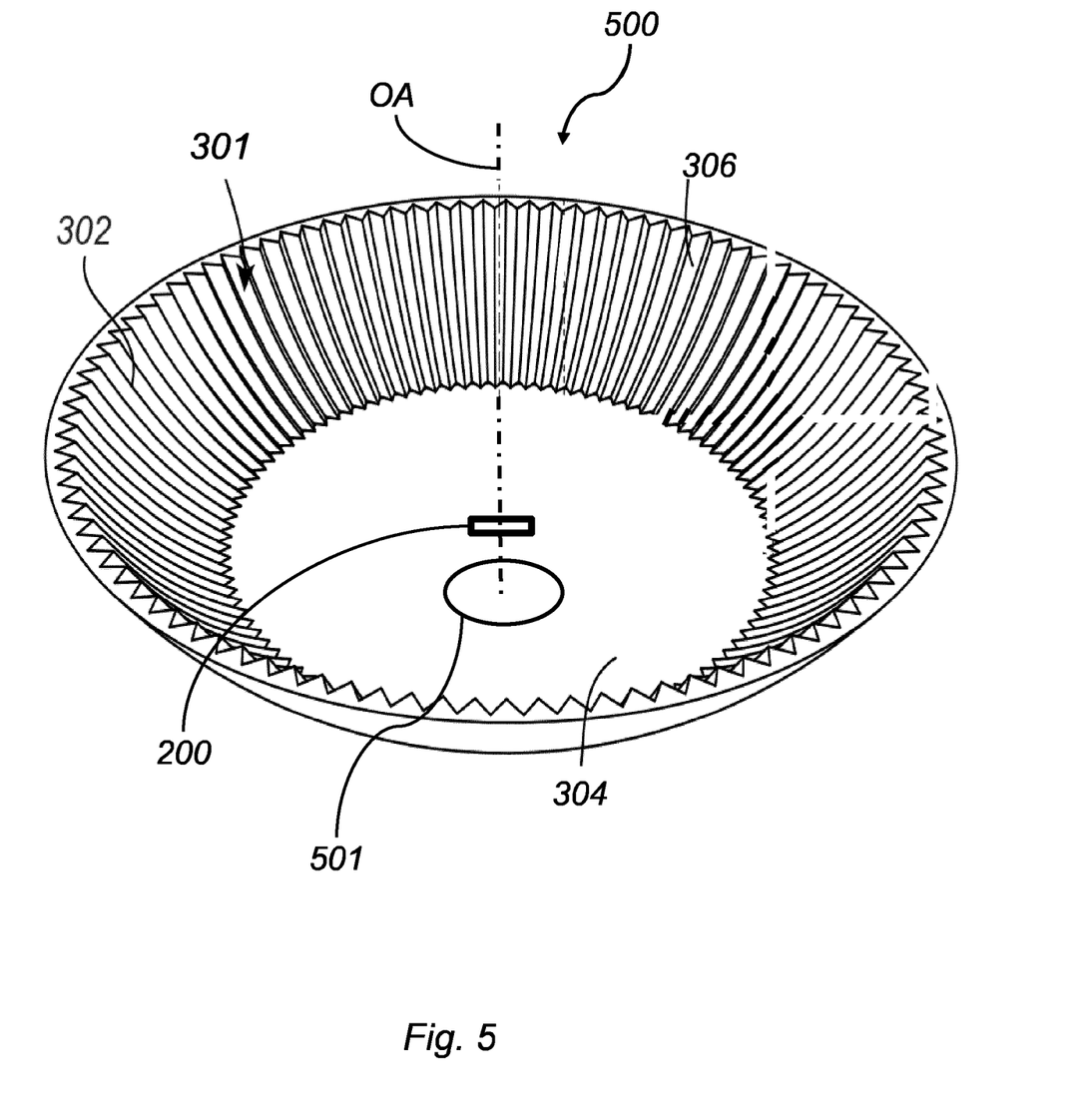
FIG. 5 is a perspective view of a luminaire as a first embodiment of the invention.

A first embodiment of a luminaire 500 according to the invention is shown in FIG. 5. Its reflector is similar in design to that of FIG. 1, with smooth and grooved areas exchanged. That is, the area that is smooth in FIG. 1 is grooved here and the area that is grooved in FIG. 1 is smooth here. The bottom grooved portion 102 is the inherently imaging portion and the upper smooth portion 104 is the inherently non-imaging portion. The reflector 500 has a grooved portion 302 at the location of the inherently non-imaging portion 104. The effect of this is to make the portion 302 imaging, so as to preserve (in the produced collimated light that exits the luminaire) at least part of the linear polarization of a linearly polarized light source 200. In this embodiment, the reflector has a smooth portion 304 which is an inherently imaging portion, likely to preserve polarization as well, although this smoothness is not essential and other surfaces could be provided for required effects. Also, there is an opening 501 at the base, narrower than the light exit opening, for facilitating mounting of the light source within the reflector during manufacture, and also for cooling by convection currents in use, but this is not essential.

Any type of linearly polarized light source may be used, such as a source composed of a light emitter such as an LED and a linear polarizer that is placed on top of the LED. Optionally, a mixing cavity is used in the source composition. The source shape is shown figuratively in FIG. 5 and is intended to indicate the polarization orientation rather than the actual physical shape. The mixing cavity's exit window has a linear polarizer such that the light that is not transmitted through the polarizer is reflected back into the cavity and thus is recycled. Such a source, composed of a mixing cavity with a polarizer at its exit window and an LED inside it for light generation, offers rather efficient generation of polarized light. Additionally, LEDs emitting linearly polarized light are available. For example, the following article disclosed a linearly polarized LED with a polarization-enhancing reflector: "Linearly polarized emission from GaInN light emitting diodes with polarization-enhancing reflector", by Martin F. Schubert, Sameer Chhajed, Jong Kyu Kim, E. Fred Schubert and Jaehee Cho2, 3 Sep. 2007/Vol. 15, No. 18/OPTICS EXPRESS 11218, available at: https://www.ecsespi.edu/~schubert/Reprints/2007-Schubert-MF-(OpticsExpress)-Linearly-polarized-emission-from-GaInN-LEDs-with-polarization-enhancing-reflector-.pdf.

Figure 6A:
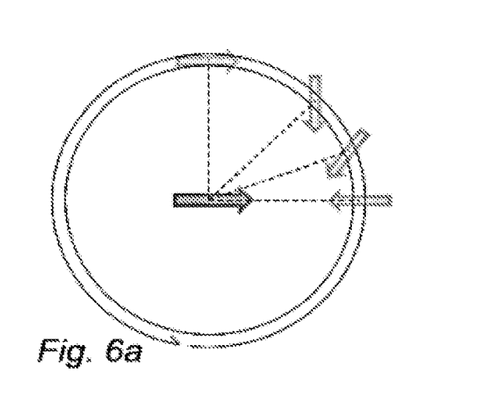
FIG. 6a is a schematic diagram taken in a plane normal to the optical axis of a small part (i.e. a ring) of a smooth portion of a parabolic reflector such as that of FIGS. 1 and 2.
Figure 6B:
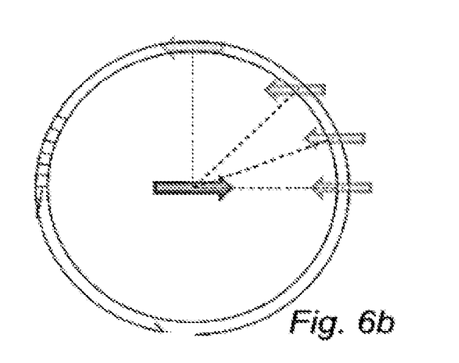
FIG. 6b is a schematic diagram the same small part as in FIG. 6a but with grooves such as in the luminaire of FIG. 5.
Figure 7A:
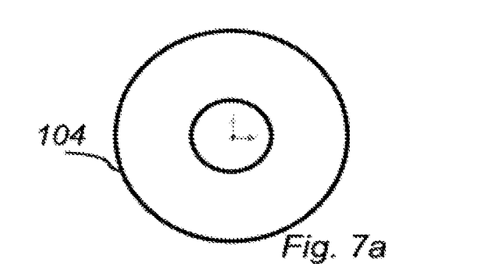
FIG. 7a is a top view from the light exit window of a parabolic reflector such as that of FIGS. 1 and 2.

The effect of the grooves in imaging the source, which has been described above in relation to the rotation of the pinhole images of the source, is illustrated in FIGS. 6a and 6b, which represent respectively a smooth and a grooved portion of the parabolic reflecting portion. The part is a ring of the parabolic reflecting portion shown in top view in FIGS. 7a and 7b respectively. The portions illustrated correspond to the inherently non-imaging upper portion-paraboloidal portion 302 of FIG. 5. In FIG. 7a, the non-imaging upper portion of the parabola produces all orientations (as indicated by the produced pinhole images of the arrow in FIG. 6a) of the polarization in the final collimated beam, so the linear polarization of the source is not preserved; whereas in FIG. 7b the V-grooves 306 make the same parabola an imaging collimator whose produced beamlets (that comprise the final collimated beam) have the same orientation (as indicated by the produced pinhole images of the arrow in FIG. 6b) and thus preserve the source polarization. FIGS. 6a and 6b illustrate the non-imaging and imaging collimators by showing the orientation of the produced pinhole images of the source that is represented by the arrow. Pinhole images of the arrow in FIGS. 6a and 6b are created by the beamlet reflected by that part of the collimator underneath the image. Therefore, the orientation of the beamlet corresponds to the orientation of the pinhole image. The arrow is chosen solely to illustrate the mechanism of imaging and non-imaging collimator by showing rotation of the produced beamlets with respect to the orientation of the source.

Figure 6C:
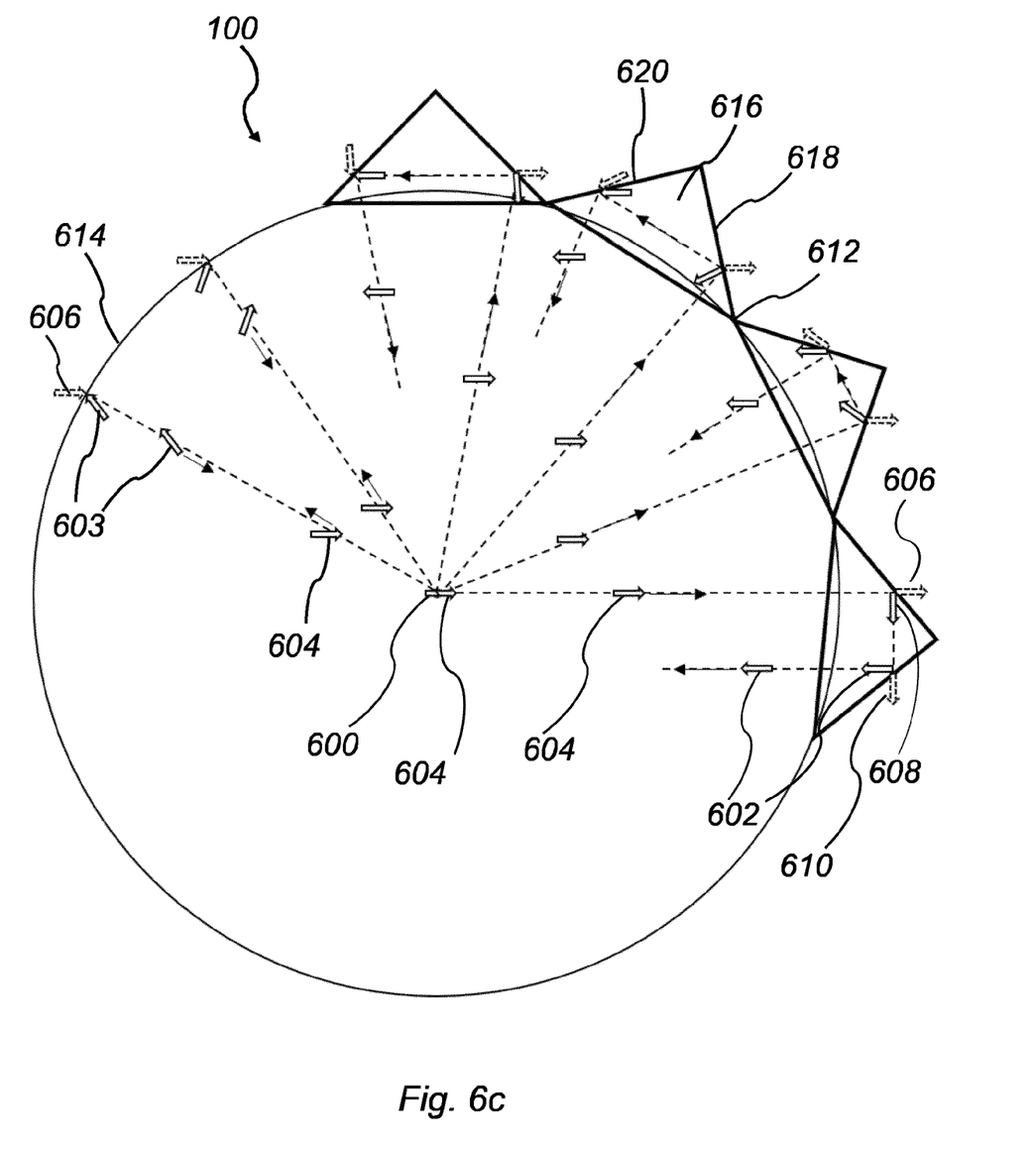
FIG. 6c is a detailed view of how polarization of polarized light is changed or maintained by respectively a smooth portion and a grooved portion of the reflector.

In this respect FIG. 6c shows and explains how polarization of polarized light is changed or maintained by respectively a smooth portion and a grooved portion of the reflector. FIG. 6c schematically shows a collimating reflector 100 having a smooth portion 614 and having a grooved portion 612 comprising grooves 616 with a first 618 and a second side facet 620. The size of the grooves is exaggerated for the sake of explanation. The light source 600 issues light rays with specific initial polarization 604 in a specific direction, schematically indicated by an open arrow. When said ray with initial polarization direction 604 is directed to a groove 616 and impinges on the first side facet 618 of said groove, the initial polarization direction 604 of the light ray changes into a first reflected light ray with a first changed polarization direction 608, which is a mirror image of the initial polarization direction 604 (shown as a dotted virtual image 606) mirrored in the first side facet. Subsequently, when the first reflected light ray with a first changed polarization direction 608 impinges on the second side facet 620, the first changed polarization direction 608 of the light ray changes into a second reflected light ray with a second changed polarization direction 602, which is a mirror image of the first polarization direction 608 (shown as a dotted virtual image 610) mirrored in the first side facet. which is a mirror image of the initial polarization direction 604, shown as a virtual image 606, with respect to the first facet. As shown in FIG. 6c, the second changed polarization direction 602 is the same for rays that impinges on the grooved portion of the reflector. Hence, the polarization direction of the initial light beam by reflection at the grooved portion is maintained. This is different for rays that impinges on the smooth portion of the reflector. Rays with an initial polarization direction 604 that impinges on the smooth portion 614 undergo only a single change in polarization into a final changed polarization direction 603, which is a mirror image of the initial polarization direction 604 (indicated in ghost as virtual image 606) mirrored in the smooth portion. As shown in FIG. 6c, the final polarization directions of rays impinging on different parts of the smooth portion are mutually different. Hence, by a reflection at the smooth portion the polarization direction of the initial light beam is not maintained. It should be noted that the direction of the arrow is irrelevant when the linear polarization of the source is considered—only orientation is relevant for the linear polarization.

So, the grooved parabolic reflector portion 302 preserves a significant proportion of the linear polarization of the source. In a simulation, the linear polarization of the final light beam was 95% parallel to the orientation of the source polarization, and 5% normal to it. This is in contrast with the smooth parabolic reflector portion 104 (corresponding to portion 104 of FIGS. 1 and 2) which produced just 73% and 27% in the parallel and normal directions respectively.

In the embodiments of the invention of FIGS. 4 and 5, the reflector is generally parabolic, but, as explained above with reference to FIGS. 1 to 4, this is not essential. The reflector could in principle be of any shape, but will most often be parabolic or very close to a parabolic shape. Additionally, the source does not have to be at the focal point of the reflector. In principle, the source could be placed not exactly at the focus; or the reflector may have no focus.

A second embodiment of the invention exploits the further aspect of the invention that the degree of preservation of linear polarization may be varied selectively, by dividing the reflector into zones around the optical axis and rotating the reflector with respect to the source around the optical axis. The degree of the change of polarization orientation of the reflected beamlets depends on the position of each reflected beamlet, in the plane normal to the optical axis, with respect to the orientation of the source polarization, as shown in FIGS. 6a and 6b. Because the linear polarization is characterized by its orientation and not the direction, the grooves can be placed selectively only in specific areas—the areas that rotate polarization the most in the case of a smooth reflector, as in FIG. 6a.

Figure 7B:
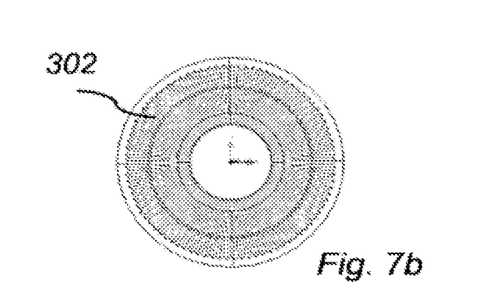
FIG. 7b is a top view from the light exit window of a parabolic reflector such as that of FIG. 5.
Figure 8A:
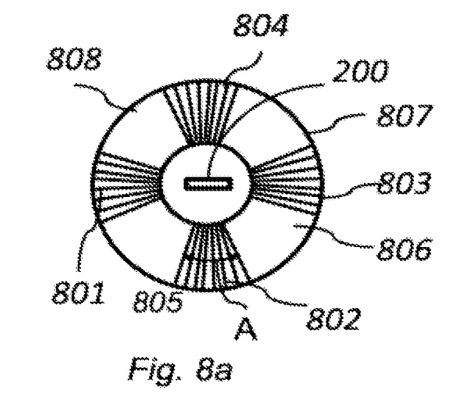
FIG. 8a is a partial top view from the light exit window of a luminaire as a second embodiment of the invention with grooved zones.
Figure 8B:
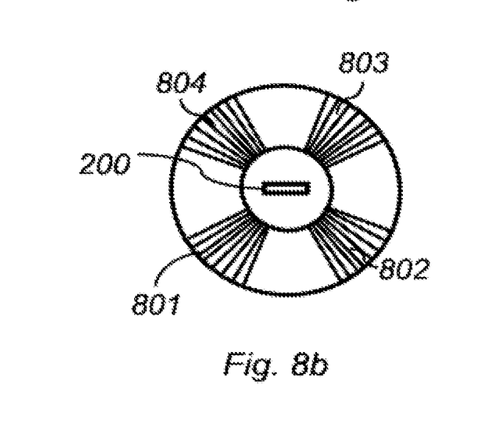
FIG. 8b is a partial top view corresponding to FIG. 8a but with the grooved zones at a different rotational position.

As shown in FIGS. 8a and 8b, the grooved portion 302 of FIGS. 5 and 7b is replaced with a semi-grooved reflector. In this example, there are four grooved zones 801, 802, 803, 804 of equal azimuthal angular extent shown as angle A in FIG. 8a: 45 degrees, separated by smooth zones 805, 806, 807, 808 also of 45 degrees. When such a semi-grooved reflector is rotated by 45 degrees about its axis, as shown in the transition from FIG. 8a to FIG. 8b, the beam changes, at least in part, from polarized to non-polarized. In a simulation, the linear polarization of the exit beam was 89% in the parallel (to the orientation of the source polarization) direction and 11% in the normal (to the orientation to the source polarization) direction in FIG. 8b; in FIG. 8a the corresponding amounts were 77% and 23%. The beam polarization can be smoothly adjusted by rotational adjustment of the angle of the reflector relative to the light source. This adjustment can be done on the fly, in use by a customer or fitter of the luminaire, or in a late stage customization at the factory to enhance the stock keeping unit, SKU, by minimizing the number of different components. Furthermore, it can be dynamically adjusted during the operation of the luminaire.

The division into grooved and non-grooved regions around the axis may be done in many different ways. The angular extent A of each grooved zone may be not exactly 45 degrees, for example in a range of 40 to 50 degrees. This angle will also depend on the number of grooved zones. The zones need not be equal in extent. Also, they need not extend on the axis OA fully along the inherently non-imaging portion of the reflector. Further, since the effect of grooves becomes the opposite in the inherently imaging portion of the reflector, such as portion 304 of FIG. 5, the adjustment of the polarization preservation may be achieved by selective movement of grooved regions between inherently imaging and non-imaging portions such as the portions 302 and 304 of FIG. 5, e.g. by a rotation about a different axis.

There could in principle be a different number of zones. For example, there could be only one grooved zone and one smooth or otherwise non-grooved zone. This could still provide some adjustability of the degree that the linear polarization is preserved.

The invention could alternatively be exploited in reflectors with configurations similar to those of FIGS. 1 to 4, taking account of the opposite effect that is required, namely imaging the polarized light source. In one example, the grooved zone 102 of FIG. 1 could be broken up into plural grooved zones separated by non-grooved zones, for example four of each as shown in FIGS. 8a and 8b. Alternatively, in the luminaires of FIGS. 1 and 2, the effect could be achieved by introducing a lens over the light source, such as the lens 308 shown in FIG. 3, so that the grooves 106 would be on an inherently non-imaging portion 102 corresponding to portion 304 of FIG. 3. In FIG. 3, the lens 308 could be removed. In FIG. 4, grooves could be provided on the upper portion 404, and optionally also removed from the lower portion 402.

Depending on the type of polarized light source and the way in which it is mounted to the reflector, the polarized light that it emits may be reflected in only the upper part of the reflector, or only in the lower part of the reflector, or both; and some of the light may exit the luminaire without undergoing any reflection in the reflector, as it may be emitted towards the exit window close enough to the optical axis.

Figure 9:
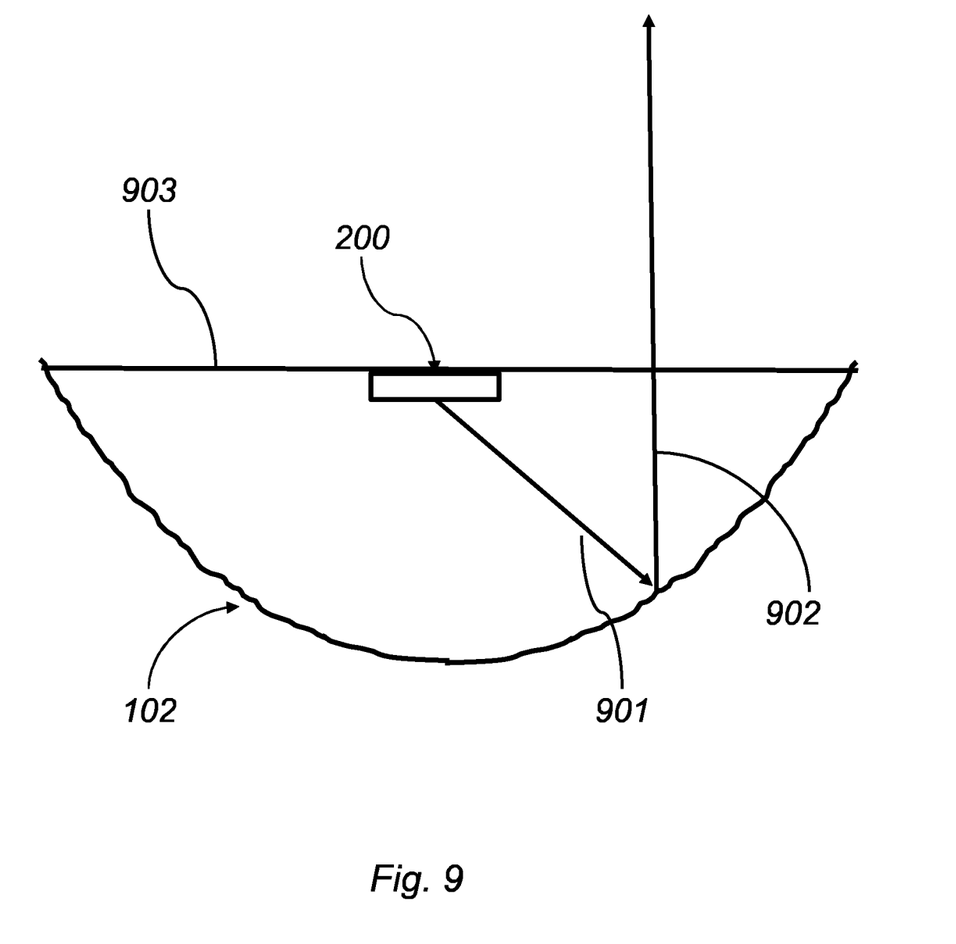
FIG. 9 is a schematic cross sectional view of a luminaire including the collimating reflector of FIG. 1, configured for indirect illumination.

In the example of FIG. 9, showing only the grooved imaging portion 102 of reflective surface 101 of FIG. 1, light 901 from a light source 200, mounted to the reflector by means of an open frame or spider 903, is emitted downwards and is reflected as light 902; this is an example of indirect illumination, since no light exits the luminaire without first being reflected.

The indirect illumination configuration in combination with alternating grooved and non-grooved zones offers better polarization 'switchability'. That is, in the non-preserving mode there should be approximately 50/50 polarization in two orthogonal directions. This is in contrast to 30/70 in the case of direct illumination. The reason for this is better control of the light, as all of it hits the reflector before forming the final beam.

In a further embodiment of the invention, each of the top and bottom parts of the reflector, respectively above and below the light source, may have a set of grooved zones such as the four grooved zones 801-804 of FIGS. 8a and 8b. In the example of a parabolic or nearly parabolic reflector, the top portion, which is inherently non-imaging, may have the grooves at an orientation, relative to the source 200, as shown in FIG. 8b, to introduce some preservation of linear polarization. The bottom portion, which is inherently imaging, may have the grooves at a different orientation, as shown in FIG. 8a, which in this example is 45 degrees different from the top grooved zones. This set of grooved zones at the bottom portion will not greatly spoil the linear preservation effect of imaging, at the orientation shown. The reflector may be fixed relative to the light source. However, in a preferred embodiment, the entire reflector including both sets of grooved zones is rotatable relative to the light source 200, to vary the linear polarization preservation degree. A rotation of the zones away from the orientation shown in FIGS. 8a and 8b will have a combined effect resulting from both sets of grooves, since the rotation will reduce the degree of polarization preserved at the top and the bottom of the reflector. When this happens, i.e. when the inherently non-imaging (top) portion moves to the orientation of FIG. 8a and the inherently imaging (bottom) portion moves to the orientation of FIG. 8b, the polarization is not preserved. This feature, although described here with reference to parabolic or nearly parabolic shapes of reflector, may also be applied to the provision of zones in any other appropriate shape of reflector.

In one example, the light source is an LED mounted by a frame such as a spider to the reflector so that it is generally at the focal point with its plane normal to the optical axis. The light may be output exclusively in directions away from the light exit window, i.e. downwardly in FIGS. 1 to 5, in which case the luminaire operates with exclusively indirect emission, as all rays are reflected. In another example, the light may be emitted from the source both upwardly and downwardly, from both ends of its body, so that most of the light, or all of the light, is reflected, and all portions of the reflector are used. The source may alternatively emit in all directions, so that some will exit directly, without any reflection in the reflector. Light emitted directly will retain its polarization, so will complement the polarized light that has been reflected in the or each portion of the reflector that has been made imaging by grooves or that is inherently imaging.

As described above, the light source may be mounted rotatably about the optical axis. This has the effect that there is relative rotation of the grooved surfaces and the direction of linear polarization of the source. Where the source includes an output linear polarizer, the whole light source or just the output linear polarizer of the light source may be mounted rotatably about the optical axis relative to the reflector. This relative rotation may be used to control the degree of polarization of the output collimated light. It is thus possible to obtain the required control by rotating the polarizer, or the reflector, or the source with the polarizer, or even by adding a polarization rotating element (not shown) on the source.

A luminaire embodying the invention may be manufactured and assembled in a manner similar to a conventional such luminaire, except for the process of forming the reflector with grooves, which may be done by any appropriate known process such as molding. The process comprises mounting the linearly polarized light source 200 on the optical axis OA of the collimating reflector 301 and positioning the light source so that its direction of linear polarization is normal to the optical axis and is at a selected azimuthal angle, about the optical axis, with respect to the grooved zone or zones such as to provide a required degree of linear polarization in the delivered collimated light. If the azimuthal angle is to be fixed, the manufacturing process may include the use of formations on the reflector for registering with the shape of the light source to orientate it correctly. If the azimuthal angle is to remain variable, a LED light source, for example, may be provided with a frame having for example a stem (not shown) on its central axis normal to the plane of the polarization direction of the LED, for rotary mounting on a suitable formation (not shown) on the reflector on the optical axis OA. The angle may then be adjusted at a late stage of manufacture, or else during fitting or subsequent use. It is possible to precalculate the effect, e.g. using a computerized simulation. The adjustment could alternatively be made whilst the degree of linear polarization of the output beam is measured, or whilst some other quality of the output is measured, so that the required beam may be produced by angular adjustment in a feedback process, manually or automatically.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire comprising:
a linearly polarized light source having a polarization direction;
and a collimating reflector arranged to collimate light from the light source towards an optical axis (OA) extending through the light source, comprising a paraboloidal shaped reflector body disposed around the optical axis and having a focal point at or near which the light source is mounted and comprising a light exit window for delivering the collimated light, wherein the reflector body comprises a reflective inner surface having a non-imaging portion wherein beamlets are reflected that are emitted by the light source at an angle Θ smaller than 90° with respect to the optical axis (OA) and wherein such reflected beamlets are imaging;
wherein the reflective inner surface comprises a set of grooves at least in a part of the non-imaging portion, which grooves each extend in a respective plane including the optical axis, each groove comprising two flat side surfaces to cause light from the light source to undergo a double reflection in the groove to emerge at a same angle as their incidence angle, by the grooves said part of the non-imaging portion of the collimating reflector is converted into an imaging reflector portion.

2. A luminaire as claimed in claim 1, wherein the polarization direction is normal to the optical axis (OA).

3. A luminaire as claimed in claim 1, wherein the reflective inner surface comprises:
a set of grooved zones, each zone comprising a set of the grooves which each extend in a respective plane including the optical axis, each groove comprising two flat side surfaces to cause light from the light source to undergo a double reflection in the groove;
and at least one non-grooved zone, wherein the grooved zones and the non-grooved zone or zones alternate on the inner surface around the optical axis.

4. A luminaire as claimed in claim 1, wherein there are at least two of the grooved zones.

5. A luminaire as claimed in claim 4, wherein there are four of the grooved zones.

6. A luminaire as claimed in claim 5, wherein each grooved zone extends around an angle (A) of between 40 and 50 degrees in a plane perpendicular to the optical axis.

7. A luminaire as claimed in claim 1, wherein the grooves have a 90+/−10 degree base angle α as viewed from within the reflector.

8. A luminaire as claimed in claim 1, wherein the grooved zones are for providing reflection either by specular reflection or by total internal reflection.

9. A luminaire as claimed in claim 1, wherein the optical axis (OA) passes through a center of the light exit window, wherein the general reflector shape is rotationally symmetric about the optical axis.

10. A luminaire as claimed in claim 1, wherein the grooved zones are in a first region of the reflective inner surface, and wherein the reflective inner surface further comprises a second, non-grooved region which extends all around the inner surface.

11. A luminaire as claimed in claim 10, wherein the non-grooved region is at an imaging portion of the reflector body and first region is at a non-imaging portion of the reflector body.

12. A luminaire as claimed in claim 1, wherein the light source comprises a light emitting diode and an output linear polarizer and the light source or an output linear polarizer of the light source is mounted rotatably about the optical axis (OA) relative to the reflector.

13. A method of assembling a luminaire comprising:
mounting a linearly polarized light source on an optical axis (OA) of a collimating reflector, the collimating reflector comprising:
a paraboloidal shaped reflector body disposed around the optical axis and having a focal point at or near which the light source is mounted and comprising a light exit window for delivering collimated light, wherein the reflector body comprises a reflective inner surface, wherein the reflective inner surface comprises:
at least one grooved zone comprising a set of grooves which each extend in a respective plane including the optical axis, each groove comprising two flat side surfaces to cause light from the light source to undergo a double reflection in the groove to emerge at a same angle as their incidence angle, the grooves thereby converting a non-imaging portion of the collimating reflector into an imaging reflector portion; and
at least one non-grooved zone, wherein the grooved zone or zones and the non-grooved zone or zones alternate on the inner surface around the optical axis; and
positioning the light source so that its direction of linear polarization is normal to the optical axis and is at a selected azimuthal angle, about the optical axis, with respect to the grooved zone or zones such as to provide a required degree of linear polarization in the delivered collimated light.

\* \* \* \* \*